Figure 1:
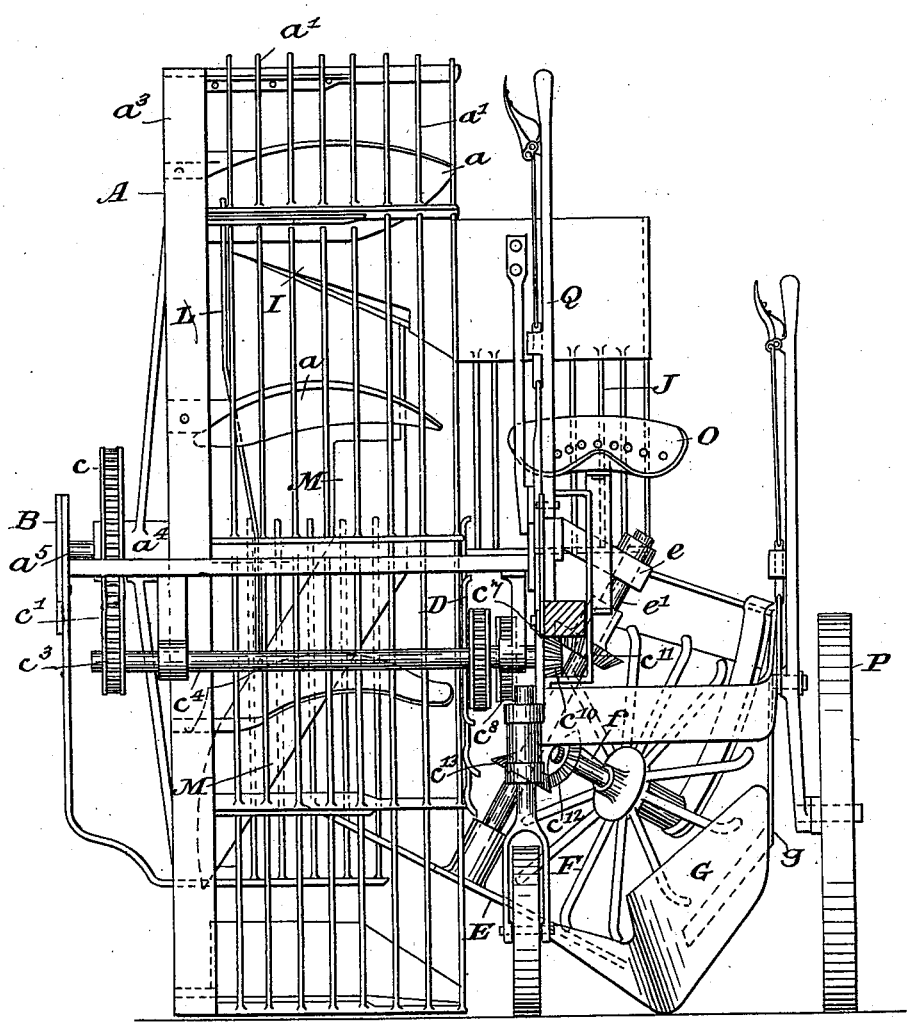

(No Model.) 3 Sheets—Sheet 1.

J. N. COCKER.
POTATO HARVESTER.

No. 511,511. Patented Dec. 26, 1893.

WITNESSES:
E. B. Bolton
E. K. Sturtevant

INVENTOR
Joseph North Cocker
BY
ATTORNEYS

THE NATIONAL LITHOGRAPHING COMPANY,
WASHINGTON, D. C.

(No Model.) 3 Sheets—Sheet 2.

J. N. COCKER.
POTATO HARVESTER.

No. 511,511. Patented Dec. 26, 1893.

WITNESSES:
L. B. Bolton
E. K. Sturtevant

INVENTOR
Joseph North Cocker
BY
Richards & R
ATTORNEYS (No Model.)  
3 Sheets—Sheet 3.

J. N. COCKER.
POTATO HARVESTER.

No. 511,511.  
Patented Dec. 26, 1893.

WITNESSES:  
E. B. Bolton  
E. K. Sturtevant

INVENTOR  
Joseph North Cocker  
BY  
Richards & R  
ATTORNEYS

THE NATIONAL LITHOGRAPHING COMPANY,
WASHINGTON, D. C.

UNITED STATES PATENT OFFICE.

JOSEPH NORTH COCKER, OF WEST DEVONPORT, TASMANIA.

POTATO-HARVESTER.

SPECIFICATION forming part of Letters Patent No. 511,511, dated December 26, 1893.

Application filed January 6, 1893. Serial No. 457,516. (No model.)

*To all whom it may concern:*

Be it known that I, JOSEPH NORTH COCKER, farmer, a subject of the Queen of Great Britain, and residing at West Devonport, in the British Colony of Tasmania, have invented an Improved Potato-Harvester, of which the following is a specification.

In a potato plow for which I obtained United States Letters Patent No. 463,098 I described the use of a large elevator wheel having projecting vanes or blades arranged to work inside a fixed screen of bars extending about one-third around its circumference, said elevator wheel being driven by rolling along the ground and serving to carry the potatoes, turned into the fixed screen by the plow share, to the upper end of the screen, where they were delivered onto an inclined inner screen leading them by a lateral chute to a trough whence they were from time to time discharged. The soil which fell through the inner screen was directed by another inclined chute onto the ground at the side of the machine. I have found in practice that there were several objections to a machine constructed in this way, and I have therefore devised the present invention.

It consists in a potato harvester constructed somewhat as above described, but having a large elevator wheel made with a series of bars with spaces between in addition to being provided with projecting vanes or blades adapted to carry the earth up round the inner screen extending for about one quarter of a revolution, over the top of which the potatoes fall onto an inclined screen leading to another inclined screen or chute, on the lower end of which a bag or basket to receive the potatoes may be supported. Behind the share used to raise the potatoes from the ground are arranged three rotating spider wheels, one set nearly horizontal, and another almost vertical or at approximately right angles to said horizontal spider, which latter is arranged to carry the tubers round into the elevator wheel, while another spider arranged vertically above the horizontal one serves to separate the top or halm from the potatoes and delivers it at the back of the machine. Suitably shaped shields are arranged inside the machine so that any earth which may fall from the screens will be delivered through the open side of the elevator wheel onto the ground, and bevel, sprocket or other gearing is provided to enable the rotating spider wheels above referred to, to be driven from the axle of the main elevator wheel. Suitable guiding and adjusting devices are provided in some convenient position adjacent to the driver's seat to enable him to easily manipulate the machine while it is in operation.

Figure 2:
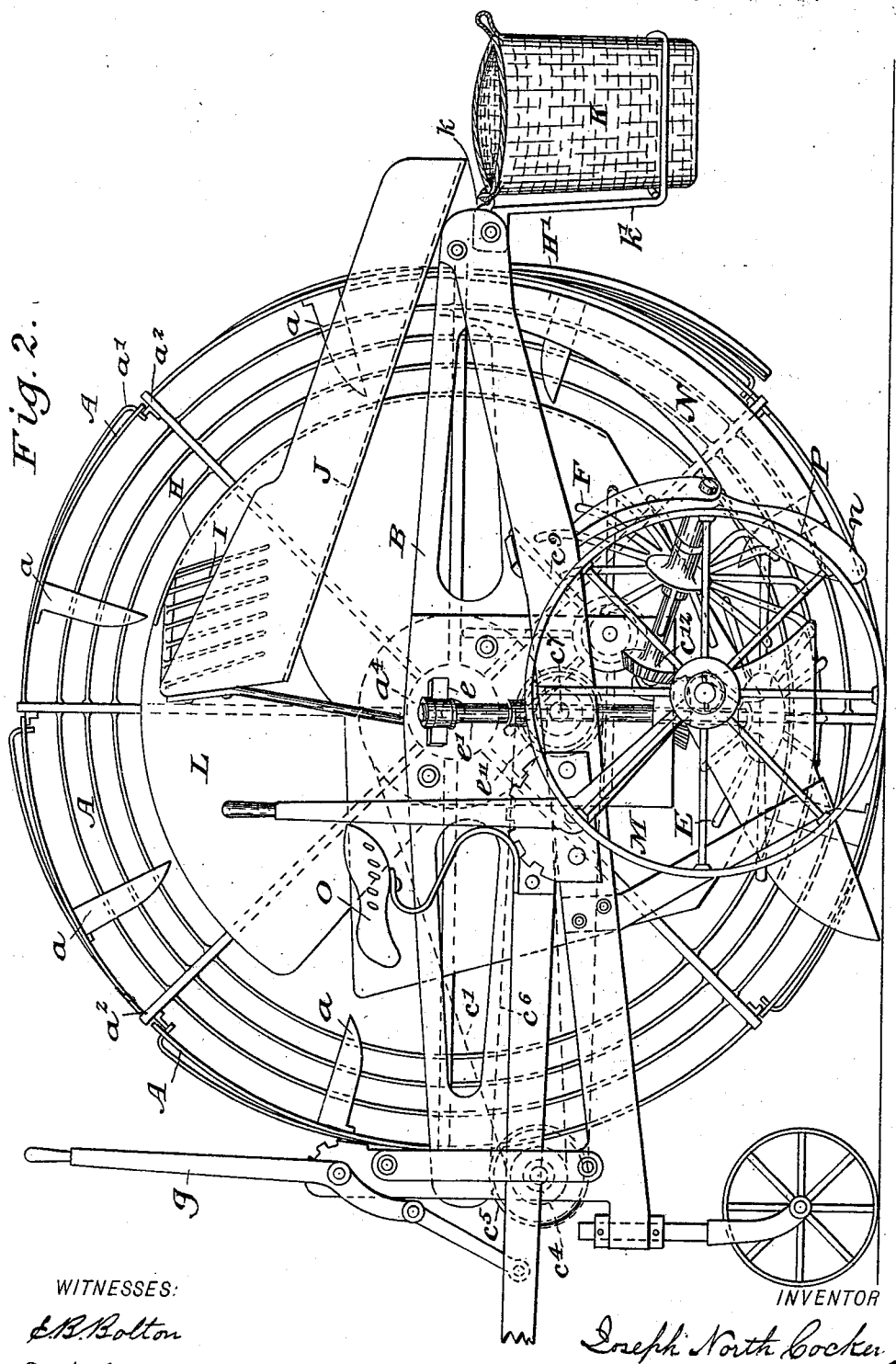
Figure 3:
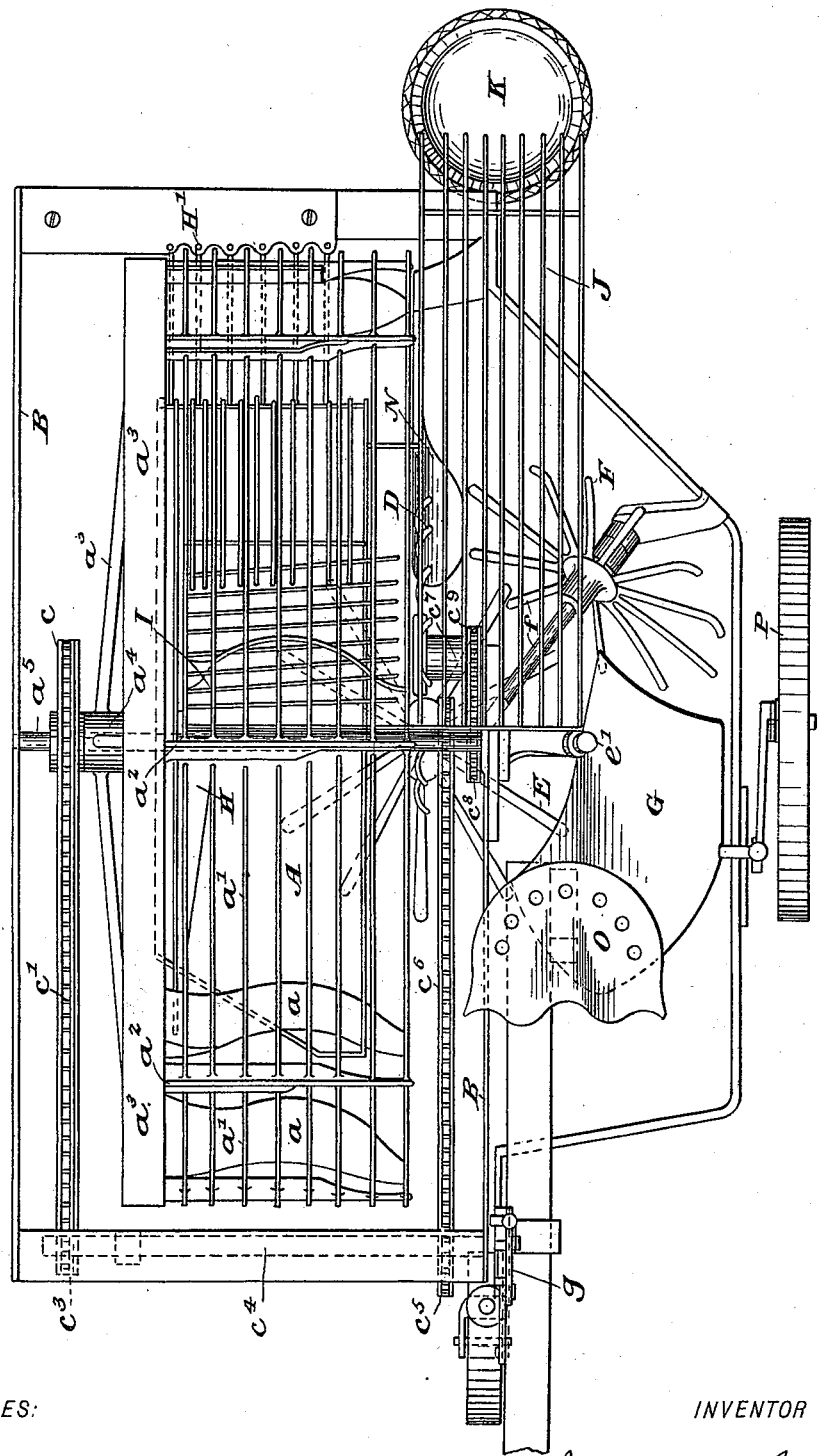

Referring to the accompanying drawings,—Figure 1 represents a front elevation of my improved potato harvester, and Fig. 2 a side elevation thereof, while Fig. 3 is a plan of said machine.

The same letters of reference indicate the same parts in all the figures.

A represents the elevator wheel which is provided with a number of inwardly projecting vanes or blades $a$, and is formed with a number of bars $a'$ having spaces left between them, as illustrated in Fig. 3, said bars being secured at their forward ends to cross bars $a^2$ projecting from or secured to the main framing $a^3$ of the wheel. The spokes constituting part of this framing are secured to a hub $a^4$ which is arranged to run loose upon a shaft $a^5$ extending across from side to side of the main framing B of the machine, said hub being further provided with a sprocket wheel $c$ from whence motion may be communicated by means of an endless chain $c'$ to a pinion $c^3$ upon a counter-shaft $c^4$ arranged in suitable bearings in front of the machine and fitted with a sprocket pinion $c^5$ wherefrom motion may be communicated through a chain $c^6$ to a short counter-shaft $c^7$, having another sprocket wheel $c^8$ gearing with a sprocket pinion $c^9$ upon the hub of a spider wheel D. The outer end of the short counter shaft $c^7$ is provided with a bevel pinion $c^{10}$ gearing with another bevel pinion $c^{11}$ upon the spindle of an approximately horizontal revolving spider E, said spindle being mounted in bearings $e$ secured to and projecting from one of the side bars of the main frame B.

F represents another spider which is arranged at the side of the machine, as illustrated in the drawings, and whose spindle $f$ is provided with a bevel pinion $c^{12}$ which is in gear with a bevel pinion $c^{13}$ upon the spindle $e'$ of the spider E.

G represents the share which is supported from the frame B of the machine by means of a bracket g and is arranged to raise the potatoes and a certain quantity of earth on to the spider E, the spider F serving to keep the potatoes upon the horizontal spider E and at the same time assisting in carrying the potatoes round to the inside of the elevator-wheel A.

H represents a screen which is supported inside the elevator wheel A and against which the potatoes and any small quantity of earth which may be mixed with them will fall as soon as the blades or vanes a have passed the horizontal center of the elevator wheel, while I represents an inclined sieve which is provided below the upper end of said screen H, and which leads down on to another screen J forming the bottom of an inclined chute, and serving to deliver the cleaned potatoes either into a basket K or other convenient receptacle or else on to the ground, as preferred. This basket may be supported by one of its handles from a hook k, its lower end being fitted within a bracket k' secured to the frame of the machine.

L represents a plate or shield which is secured to the outside of the vanes H and I and serves to direct all the earth falling through said sieves on to another inclined plate or shield M whereby it is directed through the open sides of the elevator wheel A.

N represents a plate or guide which is fitted at the side of the elevator wheel A and is supported from the frame B of the machine, so as to keep the earth and potatoes within said wheel and insure their being raised without falling over the side.

O represents an ordinary driver's seat, and P a vertically adjustable land wheel whereby the depth of cut of the share G can be regulated to a nicety as the driver may think desirable, while Q represents a lever fitted with a small adjustable hand catch to enable the draft bar to be varied to suit the cut of the machine, as will be well understood by agricultural implement makers.

In operation, the machine is drawn over the surface of the ground by horses or otherwise, and the share G passing along underneath the potatoes raises them, together with a certain amount of earth, and delivers the whole on to the revolving spider E, the spider F meanwhile preventing the potatoes from falling off said spider E, but not interfering with the free passage of any earth which may be small enough to pass through. The potatoes, with still a certain quantity of earth, are thrown into the elevator wheel A, the tops meanwhile however having been removed by the rotating spider D, and delivered over the inner side of the shield N on to the ground at the back of the machine, the spider F assisting to a certain extent in this operation also. The blades a of the elevator wheel A will carry the potatoes round inside the screen H' until they have passed the horizontal center of the machine, when they will roll down said blades or vanes a toward the center of the wheel and will then be carried up the inner screen H and be delivered on to the inclined screen I, and will pass thence down the inclined screen or chute J either on to the ground or else into a receptacle (such as K) ready to receive them. The earth mixed with the potatoes will, during this series of operations, be effectually separated therefrom, and will pass through the screens to the ground, and any earth remaining with the potatoes until near the end of the operation will pass through the upper part of the screen H or through the screen I on to the shield M whereby it will be directed through the open sides of the elevator wheel A onto the ground.

Having now particularly described and ascertained the nature of my said invention and in what manner the same is to be performed, I declare that what I claim is—

1. In combination, a revolving wheel or cage A, a series of elevating blades or vanes a carried thereby, a share G, revolving separating spider wheels, a screen H' arranged outside the wheel, a screen H arranged inside the wheel and a delivery screen receiving the potatoes from the screen H, substantially as described.

2. In combination, a revolving wheel A, a series of elevating blades or vanes a, a share G, a receiving spider E, and a vertically rotating spider D adapted to cut off the tops of the potatoes, with means for discharging the potatoes from the wheel, substantially as described.

3. In a potato harvester, the combination with a set of three rotating spiders (such as D—E—F) arranged to deliver the potatoes into a revolving elevator wheel, as well as to separate the tops therefrom, of a guard or shield (such as N) fitted at the side of said elevator wheel, substantially as and for the purposes herein described and as illustrated in the accompanying drawings.

4. In a potato harvester the employment of an elevator wheel having vanes or blades (such as a) and made of rods or bars secured to the framing of the wheel at their forward ends and left free at their rearward ends, substantially as and for the purposes herein described and as illustrated in the accompanying drawings.

In witness whereof I have hereunto set my hand in presence of two witnesses.

JOSEPH NORTH COCKER.

Witnesses:
WILLIAM ANDREW BAYLEY BIRCHALL,
*Notary Public.*
DAVID COCKER, *J. P.*